(12) United States Patent
Benson

(10) Patent No.: US 8,920,210 B2
(45) Date of Patent: Dec. 30, 2014

(54) SYSTEM AND METHOD FOR DRYING GRIT USED FOR ABRASIVE BLASTING

(75) Inventor: Ronald C. Benson, Minneapolis, MN (US)

(73) Assignee: Ronald C. Benson, Reno, NV (US)

( * ) Notice: Subject to any disclaimer, the term of this patent is extended or adjusted under 35 U.S.C. 154(b) by 1039 days.

(21) Appl. No.: 12/818,953

(22) Filed: Jun. 18, 2010

(65) Prior Publication Data

US 2010/0323588 A1   Dec. 23, 2010

Related U.S. Application Data

(60) Provisional application No. 61/218,331, filed on Jun. 18, 2009.

(51) Int. Cl.
*B24B 49/00* (2012.01)
*F26B 19/00* (2006.01)
*B24C 9/00* (2006.01)
*F26B 11/04* (2006.01)
*F26B 23/00* (2006.01)

(52) U.S. Cl.
CPC ............... *F26B 11/04* (2013.01); *F26B 19/005* (2013.01); *B24C 9/006* (2013.01); *F26B 23/001* (2013.01)
USPC .......... 451/8; 451/75; 451/87; 451/88; 451/89

(58) Field of Classification Search
USPC ...................... 451/8, 75, 87, 88, 89
See application file for complete search history.

(56) References Cited

U.S. PATENT DOCUMENTS

| 4,394,256 | A | * | 7/1983 | Goff ........................... 209/135 |
| 5,657,876 | A | * | 8/1997 | Drenter et al. ............ 209/223.1 |
| 6,190,235 | B1 | * | 2/2001 | Csabai et al. .................. 451/36 |
| 6,514,128 | B1 | * | 2/2003 | Lyras ............................. 451/88 |

* cited by examiner

*Primary Examiner* — Lee D Wilson
*Assistant Examiner* — Shantese McDonald
(74) *Attorney, Agent, or Firm* — Dentons US LLP

(57) ABSTRACT

A method and method for processing grit used for abrasive blasting may include receiving grit blasted onto a surface, where the grit includes moisture content. Air in which the grit being recycled is being processed may be heated. The moisture content may be evaporated from the grit using the heated air to produce dry recycled grit. The dried recycled grit may be stored.

18 Claims, 13 Drawing Sheets

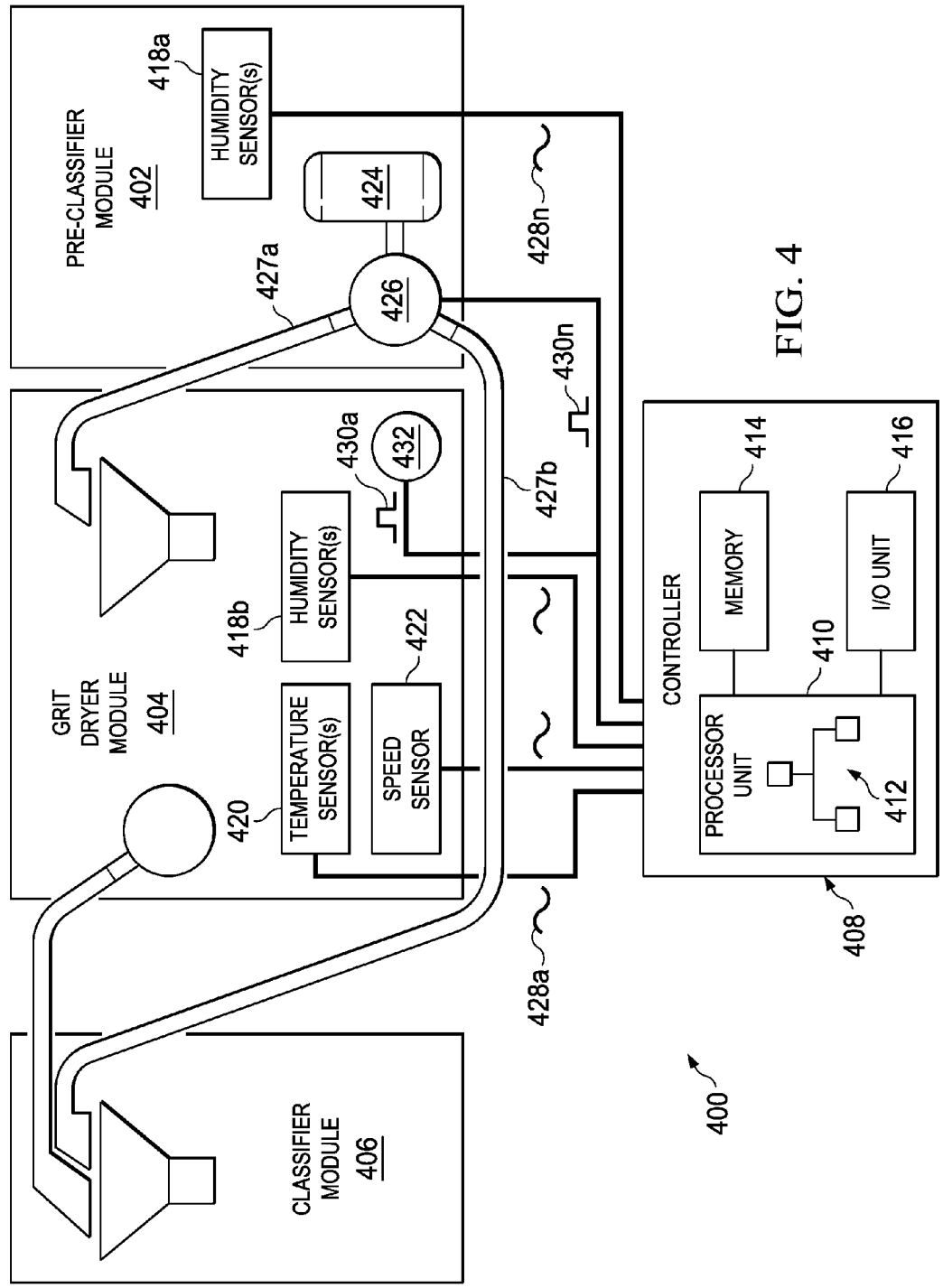

SYSTEM AND METHOD FOR DRYING GRIT USED FOR ABRASIVE BLASTING

CROSS-REFERENCES TO RELATED APPLICATIONS

This application for patent claims priority from U.S. Provisional Application Ser. No. 61/218,331, filed Jun. 18, 2009; the entire teachings of which are incorporated herein by reference in its entirety.

BACKGROUND OF THE INVENTION

The process of using grit, especially steel grit, as a blast media for cleaning steel goes back to the early 1900's, but it was not until the mid 1980's that steel grit began to be used in mobile applications. Some of the first places steel grit was used was for blast cleaning of steel tanks of all types and sizes, including nuclear torus vessels, water, and fuel tanks. When used inside a tank, moisture was typically not a problem, as the tank itself provided protection from rain.

When steel grit began to be used on the exteriors of tanks and then bridges, the exposure to the environment made contamination from sudden rainstorms and other water sources a problem. Steel grit by its nature requires absolutely dry conditions, including the use of compressed air dried to a −10 degree dew point for abrasive blasting operations where condensate would cause corrosion of the steel grit particles.

When moisture comes in contact with steel grit particles, the moisture causes the particles, which are generally size of a grain of sand, to stick together until exposure to air begins the process of corrosion, leading to rusting. When rusting occurs, the small steel grit particles are bonded together by the corrosion process as the grit dries and rust forms. The corrosion process causes clumping in the steel grit as the steel grit particles literally rust themselves together, forming irregularly shaped "rocks" of thousands of corroded particles.
The Economics of Using Steel Grit In the process of abrasive blasting of bridges, tanks, ships and other steel objects, steel grit is becoming a popular media for a number of reasons. The primary reason is economics. The steel grit particles can be recycled up to 50 or more times with non-metallic particles being removed on each pass through the recycling machine. In addition to the recycling benefit, the density of steel grit is roughly 2.5 times greater than sand or coal slag, so the impact of the steel grit on a steel structure is greater, meaning that more work is accomplished each time a particle hits the surface.

The steel grit abrasive blasting process is especially popular where hazardous paint coatings must be removed, which creates a quantity of waste that must then be disposed of as hazardous waste by law. By using steel grit, which gets recycled each time with all non-metallic hazardous material being removed through the recycling machine, the volume of waste can be reduced to roughly 1% of what would be created if non-recyclable medias like sand or coal slag are used. The recycling dramatically reduces the volume of waste that needs to be disposed of, thereby significantly reducing the cost of proper hazardous waste disposal. These economic benefits are what justifies the cost of steel grit recycling machines.

Because the cost of steel grit per ton is many times that of sand or slag, the steel grit must be recycled again and again to gain the economic benefits for the user, while at the same time reducing the volume of waste taken to disposal sites. Thus, when the grit falls to the containment surface or ground, the grit must be quickly recovered, usually using a vacuum device that pulls the grit back to the recycling machine.
Vacuuming or Gravity Recovery of Steel Grit It is common today to use powerful vacuums driven by large diesel engines to recover the steel grit, whether the steel grit is collected on the ground, on a containment surface, or into some sort of collection hopper. In the recovery process, the steel grit can become mixed with flowing water from rain, which turns the mixture into damp or wet steel grit, thereby making it even heavier than the normal density of 265 lbs per cubic foot. The added moisture additionally causes the steel grit to become sticky, where the granular steel grit no longer flows as it would at an angle of repose of between approximately 30 and 40 degrees.

Because the steel grit is so valuable, costing up to $900/ton, the operator recovers the grit back to the recycling machine even though he knows the free moisture will cause clogging and eventual clumping as the grit turns to rust. While vacuuming the steel grit for recycling, large water droplets are typically removed from the steel grit. However, enough moisture content on the grit itself remains to cause the rusting and clumping processes. In the process of vacuuming, any opening or wear of the vacuum hose can also allow water to enter the system, causing further moisture problems.

If the wet grit is allowed to sit for a prolonged period of time (e.g., a few days), the grit can become so hard that it must be removed using a jack hammer or other impact device. When sitting in a hopper, the water naturally drains to the bottom and can be drained off if a stainless steel filter screen at the bottom allows for drainage. However, moisture content residing on the surface of the steel grit that is not removed during the vacuuming process typically remains long enough to cause the rusting and clumping processes to occur.

SUMMARY OF THE INVENTION

To avoid the rusting and clumping processes of steel grit to occur, the principles of the present invention include a drying process of the steel grit. In one embodiment, the drying process may occur while recycling the steel grit through a blasting system. The drying process may occur after a pre-classification process to remove rocks and other debris from the steel grit at the blasting site. Alternatively, the drying process may be performed separately from the recycling process.

The drying process may be performed in a variety of different ways. One technique may utilize a rotary drum that allows for the steel grit to be rotated and dropped using gravitational forces through heated air. The heated air may be drawn through the rotary drum using an exhaust fan that causes a negative pressure within the rotary drum. The air may be heated in a variety of different ways, including capturing heat generated by an engine used to power the blasting system, where the heat captured from the engine may be from an exhaust of the engine, engine block, and/or radiator. The heat captured from the engine block and/or radiator may be channeled into airflow within the rotary drum (direct heat), while the heat captured from the exhaust of the engine may be channeled to a position outside of the rotary drum (indirect heat) so as to avoid introducing carbons and other gaseous material onto the grit. In addition, a flame produced by a burner or furnace, for example, using propane, diesel, natural gas, or other energy source may heat air outside of the rotary drum (indirect heat), thereby heating the drum and, consequently, air inside the drum. The heated air may be between approximately 200° F. and approximately 700° F., although other temperatures are possible, as well.

Humidity sensor(s) may be used in combination with a processing system to monitor moisture content on the grit indirectly by monitoring the moisture in the air, such as the heated air in the rotary drum, in which the grit is being recycled. The processing system may control speed of the rotary drum, angle of the rotary drum, time in which the grit is exposed to the heated air, temperature of the air, pressure of the air, speed of the heated air, and other parameters that affect the drying process. In addition, if the processing system determines that a moisture level of the air crosses a threshold level, the processing system may alter the operation of a drying module that is performing the drying process. If for example, the moisture level drops below a threshold level that is indicative that substantially no moisture exists, then the processing unit may redirect the grit to avoid the drying module and turn off the drying module to save power. If, for example, the moisture level increases, the processing unit may route the grit to the drying module and establish or alter parameter(s) to increase or decrease drying power of the drying module. A notification to an operator in the form of an audible and/or visible signal may be generated when switching grit being routed to and from the grit dryer module.

One embodiment of a method for processing grit used for abrasive blasting may include receiving grit blasted onto a surface, the grit including moisture content. Air in which the grit being recycled is being processed may be heated. The moisture content may be evaporated from the grit using the heated air to produce dry recycled grit. The dried recycled grit may be stored.

One embodiment of an abrasive blasting system may include a pre-classifier module configured to separate large objects from grit that is being recycled after being blasted against a structural surface being treated. A grit dryer module may be configured to receive the grit from the pre-classifier module and apply heat to the grit to remove moisture content from the grit. A classifier module may be configured to receive the grit from the grit dryer module and separate the grit from non-grit matter. A storage bin may be configured to store the recycled grit for reuse in abrasive blasting operations.

BRIEF DESCRIPTION OF THE DRAWINGS

A more complete understanding of the system and methods of the principles of the present invention may be obtained by reference to the following Detailed Description when taken in conjunction with the accompanying Drawings wherein:

FIG. 4 an illustration of an illustrative portion of an abrasive blasting system including a pre-classifier module, grit dryer module, and classifier module;

DETAILED DESCRIPTION OF THE DRAWINGS

Figure 1:
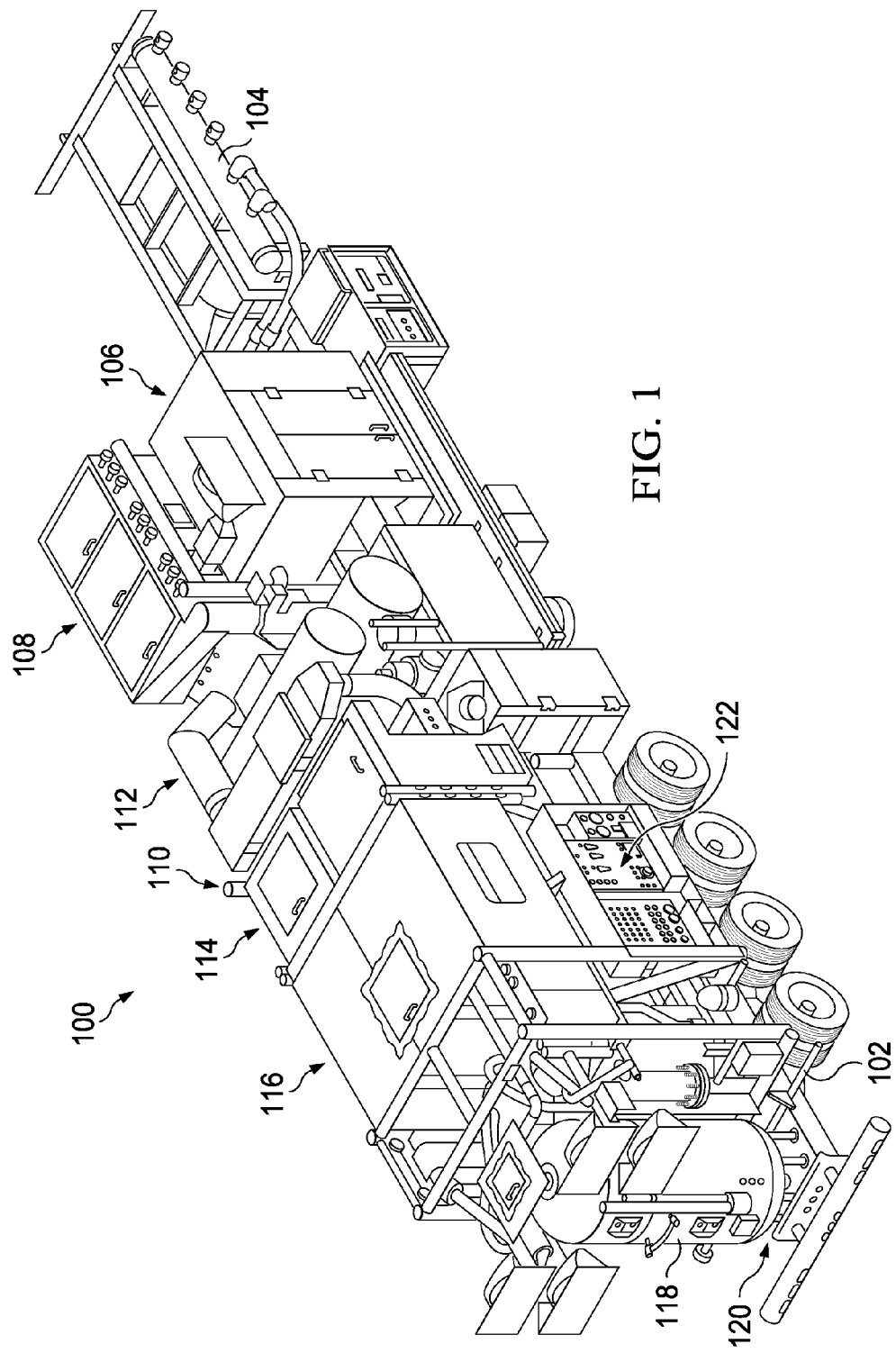
FIG. 1 is an illustration of an illustrative abrasive blasting machine that may be configured with a grit dryer module.

With regard to FIG. 1, an illustration of an illustrative abrasive blasting machine 100 is shown. The abrasive blasting machine 100 in this configuration is mobile in that it resides on a trailer 102 that enables the abrasive blasting machine 100 to be transported from job site to job site for performing abrasive blasting on a structure (e.g., bridge) at the job site. The abrasive blasting machine 100 includes a number of modules, including a pre-classifier module 112, which removes large debris and classifier module 114, which separates steel grit from smaller debris, such as paint chips, sand, and dust. To remove moisture content from the steel grit, or any grit material for that matter, a grit dryer module (See, FIGS. 2A-2D) may be adapted onto the abrasive blasting machine 100.

The abrasive blasting machine is a series of complex systems that are configured in a deliberate way to perform certain functions in a certain order. From front to rear, the abrasive blasting machine 100 includes a compressor manifold 104 that enables multiple compressors to feed into the manifold 104 for use in blowing blast media by the abrasive blasting machine 100. An engine 106, which may be a diesel engine or other powered engine, for use in producing vacuum power and generating hydraulic power for driving various components on the abrasive blasting machine 100. A vacuum 108 may be utilized to enable an operator of the abrasive blasting machine 100 to vacuum blast media after the blast media is projected onto surfaces of a structure being prepared for a protective coating to be applied thereto. An air wash 110 may be utilized to cleanse dust that is collected by the vacuum 108. A pre-classifier 112 may be utilized to sort out debris or other material that is collected by the vacuum and greater than a certain size, such as three-sixteenths of an inch. A classifier 114, such as a magnetic drum, may be configured to sort or otherwise separate the blast media, such as steel grit, from other debris, such as paint chips, that are collected by the vacuum process.

A storage hopper 116 may be utilized to store blast media that is utilized for performing the abrasive blasting by the abrasive blasting machine 100. A pressure vessel 118 may be utilized to generate a pressure for the blast media in being introduced into airflow created by a compressor. The pressure vessel 118 is in fluid communication with metering valves 120 that are selectively open and shut for introducing the blast media into airflow produced by the compressor for use in blowing the blast media onto surfaces of a structure being prepared for a protective coating to be applied thereto. In operation, airflow without blast media may be created and used by an operator of a blast hose (not shown) that includes a nozzle (not shown). Blast media may be selectively added to the airflow and directed onto surfaces of a structure. As understood in the art, the nozzle of a blast hose may include a "dead-man" switch (not shown) that, when in a first position, causes compressed airflow to be pushed through the blast hose and nozzle, and, when in a second position, causes both airflow and blast media to be pushed through the blast hose and nozzle. The dead-man switch may be in communication with a controller 122 and/or other valve control circuitry (not shown) that causes the airflow and/or blast media to be blown through the blast hose and nozzle. Alternative control switches may be utilized in accordance with the principles of the present invention.

The controller 122 may be part of the abrasive blasting machine 100 and used to control components of the abrasive blasting machine 100. The controller 122 may further be configured to collect and process sensor data from sensors that are applied to sense operation of various components of the abrasive blasting machine 100. The controller 122, which is fundamentally a processing unit that performs control and data collection functionality, may be composed of one or more computer processors and other circuitry. The controller 122 may be utilized in a manner that generates "intelligence" for owners/operators and customers of the owners/operators of the abrasive blasting machine. In accordance with the principles of the present invention, the controller 122 may be configured to control the grit dryer module for use in drying the grit.

Figure 2A:
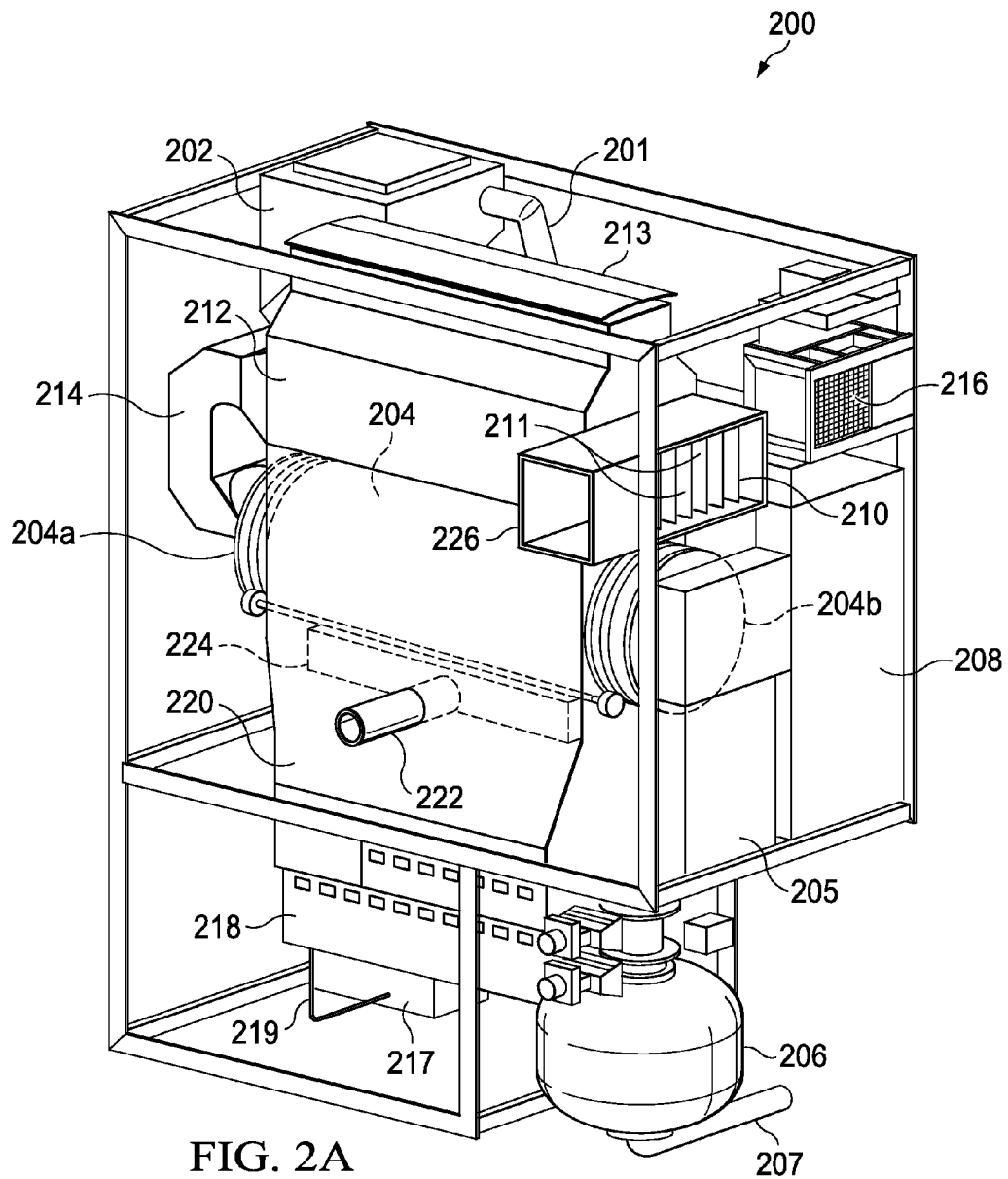
FIGS. 2A-2D are illustrations of an illustrative grit dryer module that may be incorporated into an abrasive blasting system or machine, such as the system shown in FIG. 1.

With regard to FIG. 2A, an illustration of an illustrative grit dryer module 200 that may be incorporated into an abrasive blasting system or machine, such as the system shown in FIG. 1. The grit dryer module 200 may include a pneumatic conveyor feed line 201 that is positioned to deliver grit into an infeed hopper 202. The grit may be steel grit, stainless steel grit, garnet grit, specular hematite grit, or any other grit that may be utilized for surface preparation abrasive blasting of structures, as understood in the art. The grit that enters into the infeed hopper 202 is channeled into a rotary drum 204 using gravitational forces to cause the grit to be channeled into the rotary drum 204. The rotary drum 204 may be configured to rotate the grit in a clockwise or counterclockwise radial direction. The rotary drum 204 may include strakes (See, FIGS. 2D and 2E) that lift the grit vertically until the grit falls off of the strakes by gravitational forces. In one embodiment, the strakes may be axially extended along an inside surface of the rotary drum 204. Additionally and/or alternatively, helical strake(s) may be utilized to help guide the grit within the rotary drum 204 from an entry side to an exit side. The rotary drum may be angled such that the rotary drum slopes downward from the side of the hopper 202 to the opposite side within the grit dryer module 200. For example, entry side 204a of hopper 204 may be 10 degrees higher than exit side 204b, thereby sloping downward from left to right as shown in FIG. 2A. In one embodiment, the slope of the rotary drum 204 may be altered to cause the grit within the rotary drum 204 to pass through the rotary drum 204 faster or slower, which allows the grit to be exposed to the heated air for more or less time.

As grit passes through the rotary drum 204 and exits side 204b of the rotary drum 204, the grit drops from the rotary drum 204 into a hopper 205 that funnels the grit into a pneumatic conveyor tank 206. The pneumatic conveyor tank 206 is configured to push or convey the grit through a pneumatic conveyor transfer line 207 to a next module, such as a classifier module. Rather than using pneumatic conveying, the principles of the present invention may use mechanical conveying by using augers, buckets, or any other mechanical conveying configuration. The rotary drum 204 is used to continuously rotate the grit in a fashion that enables the grit to be dried with heated air that is within the rotary drum 204. In one embodiment, the heated air may be drawn through the rotary drum 204. Alternatively, the heated air may be blown through the rotary drum 204. In addition to moisture content being removed from the grit, dust and other debris that is passing through the rotary drum 204 with the grit may be separated from the grit and collected or passed through a dust collector 208. The dust collector 208 may be a bin that includes air filters (See, FIG. 2C). The dust collector 208 may include a backflow prevention system, such as one-way valve or other valve configuration.

The heated air that is passed through the rotary drum 204 that is used to dry the grit may be drawn externally from the grit dryer module 200 through air intake vent 210. Louvers 211 that are adjustable may be utilized. The air intake vent louvers 211 may be opened or closed depending upon whether ambient outside air is desired or not. In addition, the air intake vent louvers 211 may be partially opened to control an amount of air that is drawn from the outside.

An air-to-air heat exchanger 212 may be configured to heat air that is drawn from the outside or from another heat source of the abrasive blasting system, as described below. The heat exchanger 212 may have a cap 213 positioned above to prevent rain and other environmental sources from settling around the heat exchanger. The air-to-air heat exchanger 212 is in fluid communication with the air intake vent 210 to allow the air to pass therethrough and be heated up. An air conduit 214 may be in fluid communication with the heat exchanger 212 to channel the heated air from the heat exchanger 212 into the rotary drum 204. As the heated air passes through the rotary drum, the heated air is also passed across the grit that is being dried as it drops from the strakes while rotating. An exhaust fan 216 is used to generate a negative pressure by blowing air out of the grit dryer module. The exhaust fan 216 is in fluid communication with the dust collector 208, which is in fluid communication with the rotary drum 204. Thus, as the exhaust fan 216 is blowing air out of the grit dryer module 200, the air is drawn from the dust collector 208, rotary drum 204, air conduit 214, and air intake vent 210.

In order to heat the grit such that the moisture content on the grit is evaporated or otherwise eliminated, one or more sources of heat may be applied to the grit directly and/or indirectly. The source of heat determines whether a direct or indirect application of the heat from the source is used, as described herein below.

A fuel source storage tank 217 that is used to generate a flame by a burner 218 is shown. A fuel source may include any flammable material. The fuel source may be propane, natural gas, diesel fuel, or any other solid or liquid material. The fuel stored in the fuel source storage tank 217 may be piped into the burner 218 via a fuel source conduit 219. Because fuel that is burnt generally produces certain contaminants, such as carbon molecules, heat that is produced by the burner 218 is generally used as indirect heating of the rotary drum 204 and air that is being heated by the air-to-air heat exchanger 212. While generally not advised, it should be understood that direct heat from a burner may be utilized to dry the grit, such as passing the grit below the flame. As an alternative, electric heat may be utilized, such as in the form of heat lamps or heated coils. A heat retention housing 220 is used to retain the heat produced by the burner 218 for use in indirectly heating the air in the heat exchanger 212 and rotary drum 204. The retention housing 220 and other components may be insulated to minimize heat loss and prevent injury to operators of the abrasive blasting system.

An engine exhaust conduit 222 may be attached and in fluid communication with a rotary drum heater manifold 224 that is positioned below the rotary drum 204 and extends beneath the rotary drum 204 such that heat that is vented or otherwise thermally directed toward the rotary drum 204. In one embodiment, the heat from the rotary drum heater manifold 224 releases heat substantially uniformly across the rotary drum 204. The exhaust heat that is applied to the rotary drum 204 is applied to the external surface of the rotary drum as the exhaust may have carbon and other chemical material that may negatively affect the grit. In other words, the heat from the exhaust of the engine is indirectly applied to the grit. By heating up the outside surface of the rotary drum 204, the air existing within the inside of the rotary drum is heated, thereby causing moisture content on the grit to be evaporated, although to a lesser extent than heat applied directly to the grit in the rotary drum 204 or elsewhere.

An engine heat input port 226 is shown to be in fluid communication with the air-to-air heat exchanger 212. Engine heat that is input into the engine heat input port 226 is not exhaust from the engine, but rather heat that is generated by the engine. In one embodiment, a conduit extending from the engine may be connected to the engine heat input port 226. The engine heat may be collected from an engine block, radiator at the engine or any other component of the engine. As understood in the art, the heat that is produced by an engine of the size that is used to power the abrasive blat system may produce 250 degrees Fahrenheit or higher heat. The engine heat that is passed into the heat exchanger 212 that starts at a higher temperature than that of air that is drawn in through the air intake vent 210, which means that the air that is drawn through the rotary drum 204 may be higher in temperature than air drawn in from outside the grit dryer module 200. Because the air that is collected from the engine is not exhaust, this air may be directly applied to the grit in the rotary drum 204 or elsewhere. As shown, the air intake vent and engine heat input port 226 are part of the same structure. It should be understood that the two may be separated from one another and that only one or the other may be utilized in accordance with the principles of the present invention. Still yet, it should be understood that the louvers 211 of the air intake vent 210 may be used to allow only heat from the engine to be drawn into the heat exchanger 212 or that a mixture of outside air and air drawn from the engine may be mixed. Temperature sensors (not shown) may be used to measure temperature before and after the heat exchanger 212.

The exhaust fan 216 may be a fan that is capable of generating air speeds up to 90 miles per hour. As understood in the art, capture velocity of steel grit is approximately 9,000 feet per minute. Below that air speed, steel grit, which is generally the size of grains of sand, typically are not affected when passing through the air. As such, air speed below approximately 100 miles per hour or 9,000 feet per minute may be utilized to dry the grit in the rotary drum 204. In one embodiment, the airflow of the heated air within the rotary drum 204 may be between approximately 40 and approximately 50 miles per hour. Although described as heated air, there may be times that an operator of the grit dryer module 200 may desire to run the grit dryer module 200 without passing heated air through the rotary drum 204. Such times may include simply wanting to "dust off" the steel grit.

While the grit dryer module 200 may include a number of different heat sources, both direct and indirect, it should be understood that one or more of the heat sources may be utilized in drying the grit. In one embodiment, a controller (FIG. 4) may be utilized to alter temperature of air that is being applied to the grit and may turn on and off one or more heat sources (e.g., open valves, adjust louvers, open vents, turn on and off the burner or furnace 218, or otherwise), either in response to a manual command from an operator or automatically by sensing temperature, pressure, and/or humidity within the grit dryer module 200 or pre-classifier. In one embodiment, the air temperature that is drawn through the rotary drum 204 may be between approximately 200 degrees and approximately 700 degrees Fahrenheit. Such temperatures are illustrative and other temperatures may be utilized in accordance with the principles of the present invention.

Figure 2B:
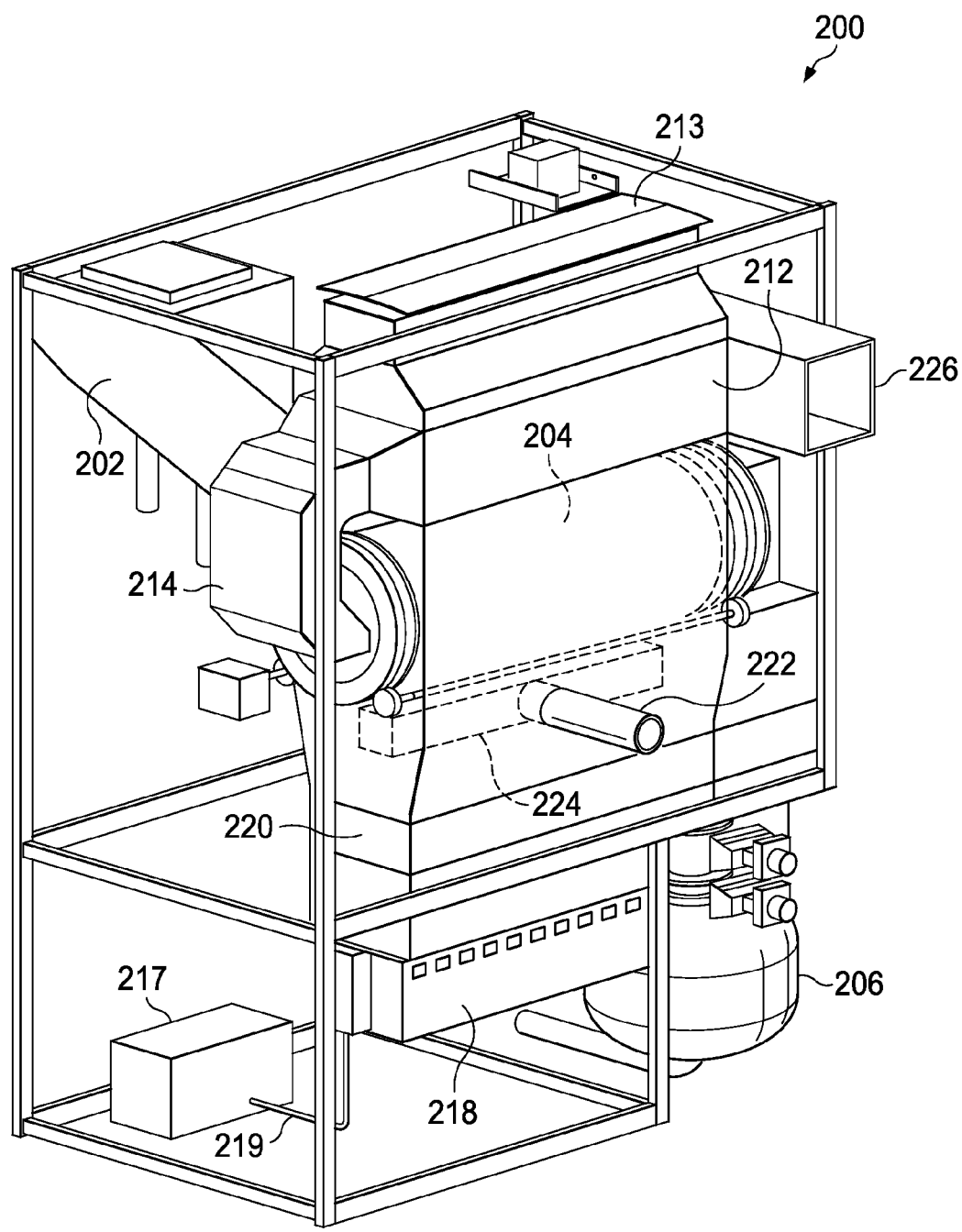

With regard to FIG. 2B, the grit dryer module is shown at a different angle to show that the air conduit 214 fluidly connects the heat exchanger 212 to the rotary drum 204. In addition, the burner 218 is more clearly shown to produce heat that is captured by the heat retention housing 220 for heating the outside of the rotary drum 204 and be channeled into the heat exchanger 212.

Figure 2C:
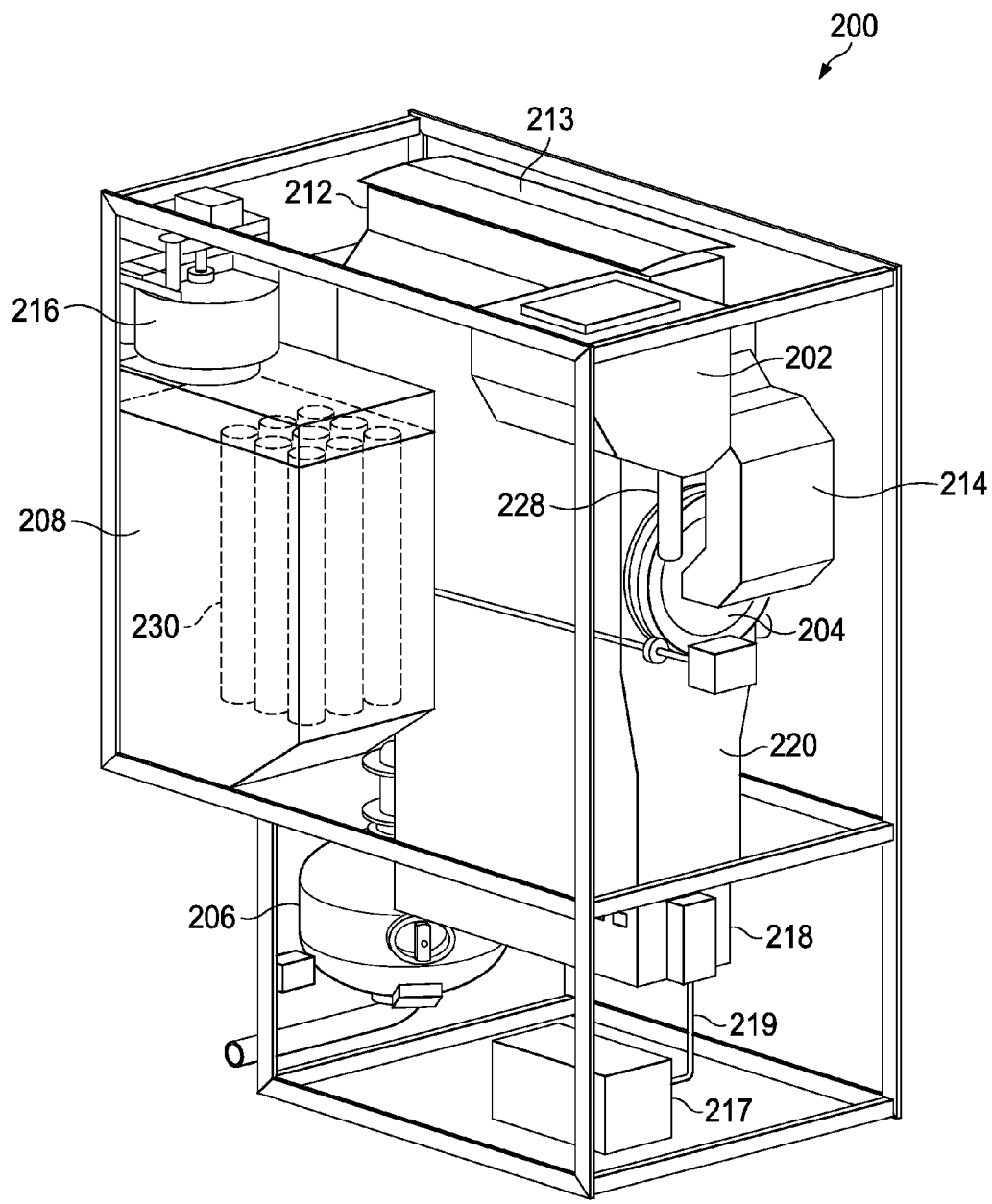

With regard to FIG. 2C, another view of the grit dryer module is shown. In this view, a pneumatic conveyor feed line 228 is shown to extend upward into the infeed hopper 202. The pneumatic conveyor feed line is fluidly connected to a conveyor tank (not shown) at a preceding module, such as a pre-classifier. It should be understood that rather than using the grit dryer module 200 as part of an abrasive blasting machine, the principles of the present invention provide for the grit dryer module 200 in the same or different configuration that provides for the functionality of the grit dryer module to be used. In such a case, an infeed hopper 202 may simply receive grit from the top, via a vacuum hose, or otherwise as opposed to from a pneumatic conveyor feed line 228.

Air filters 230 are shown to reside within the dust collector 218. The air filters 230 are adapted to be used at high temperatures (e.g., 250 degrees Fahrenheit or higher) for filtering air prior to being released outside of the grit dryer module 200 via the exhaust fan 216. As shown, the air filters 230 extend vertically upward in the dust collector 218, and, as the exhaust fan 216 draws air from above the air filters 230, air is drawn into the air filters 230 from the bottom of the air filters 230 and upward through the air filters 230. As such, clean air is exhausted from the grit dryer module 200 by the exhaust fan 216 as the air filters 230 have cleaned the dusty air that has been passed across the grit. The air that is exhausted by the exhaust fan 216 may also be moist as moisture content is evaporated from the grit in the rotary drum 204 and drawn through the dust collector 208 and blown out by the exhaust fan 216 with the air.

Figure 2D:
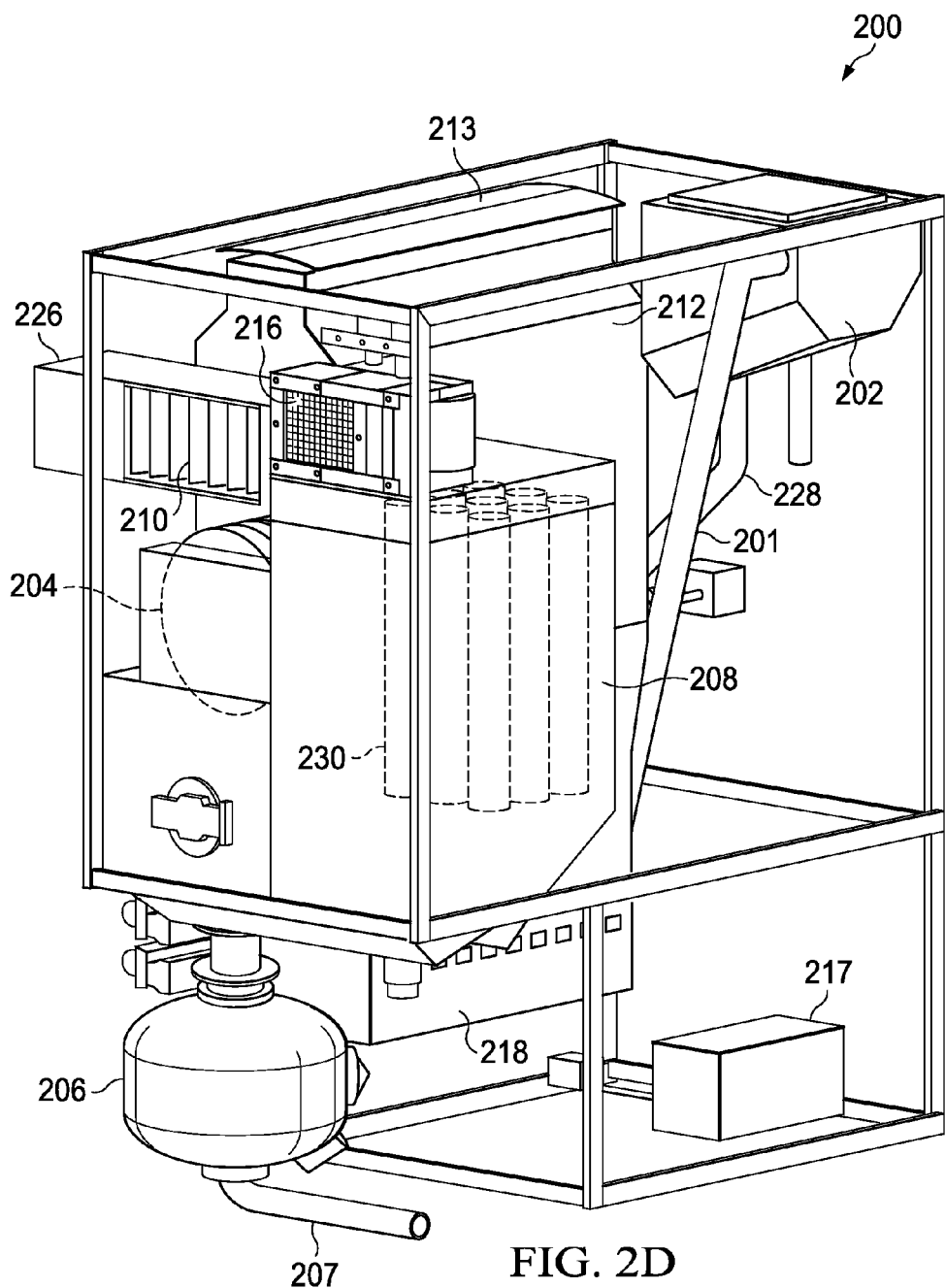

With regard to FIG. 2D, another angle of the grit dryer module 200 is shown. This angle provides another view in which the air filters 230 can be seen to be in fluid communication with the exhaust fan 216. In addition, the pneumatic conveyor tank 206 is shown to be in fluid communication with the pneumatic conveyor transfer line 207 that transfers grit from the grit dryer module 200 to a next module of the abrasive blast system, such as a classifier module that further separates steel grit particles from debris less than approximately 3/16 of an inch, such as paint chips.

Figure 2E:
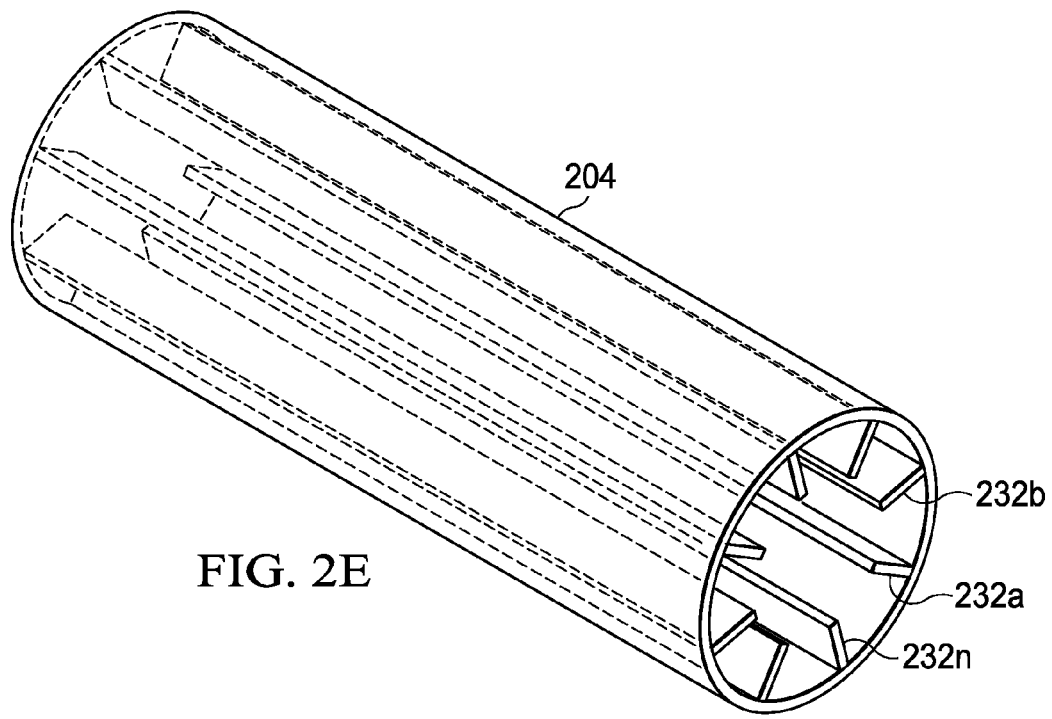
FIGS. 2E and 2F are illustrations of an illustrative rotary drum with strakes extending therethrough for rotating grit that is being dried.
Figure 2F:
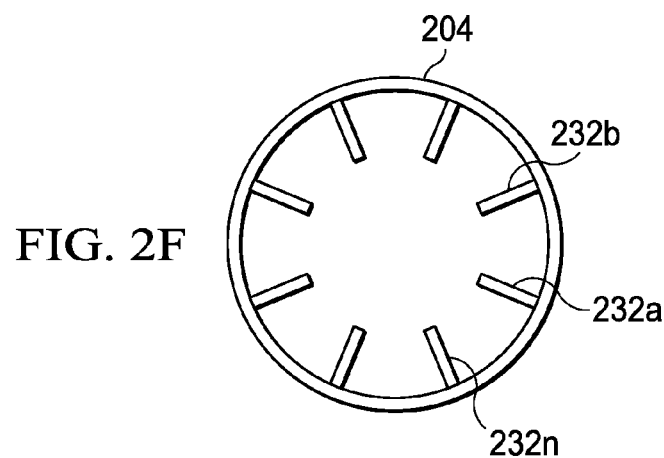

With regard to FIG. 2E, an illustration of the rotary drum 204 is shown to include strakes 232a-232n (collectively 232) that extend axially through the rotary drum 204. As shown in FIG. 2F, the strakes 232 of the rotary drum 204 are shown to extend radially inward from an inside surface of the rotary drum 204. It should be understood that the angles and dimensions of the strakes 232 may be set such that the grit drops within the rotary drum 204 at different angles as the rotary drum 204 is rotating. It also should be understood that a helical or other geometric configuration of strakes may be utilized in accordance with the principles of the present invention to assist the grit in passing through the rotary drum at a certain rate.

Figure 3A:
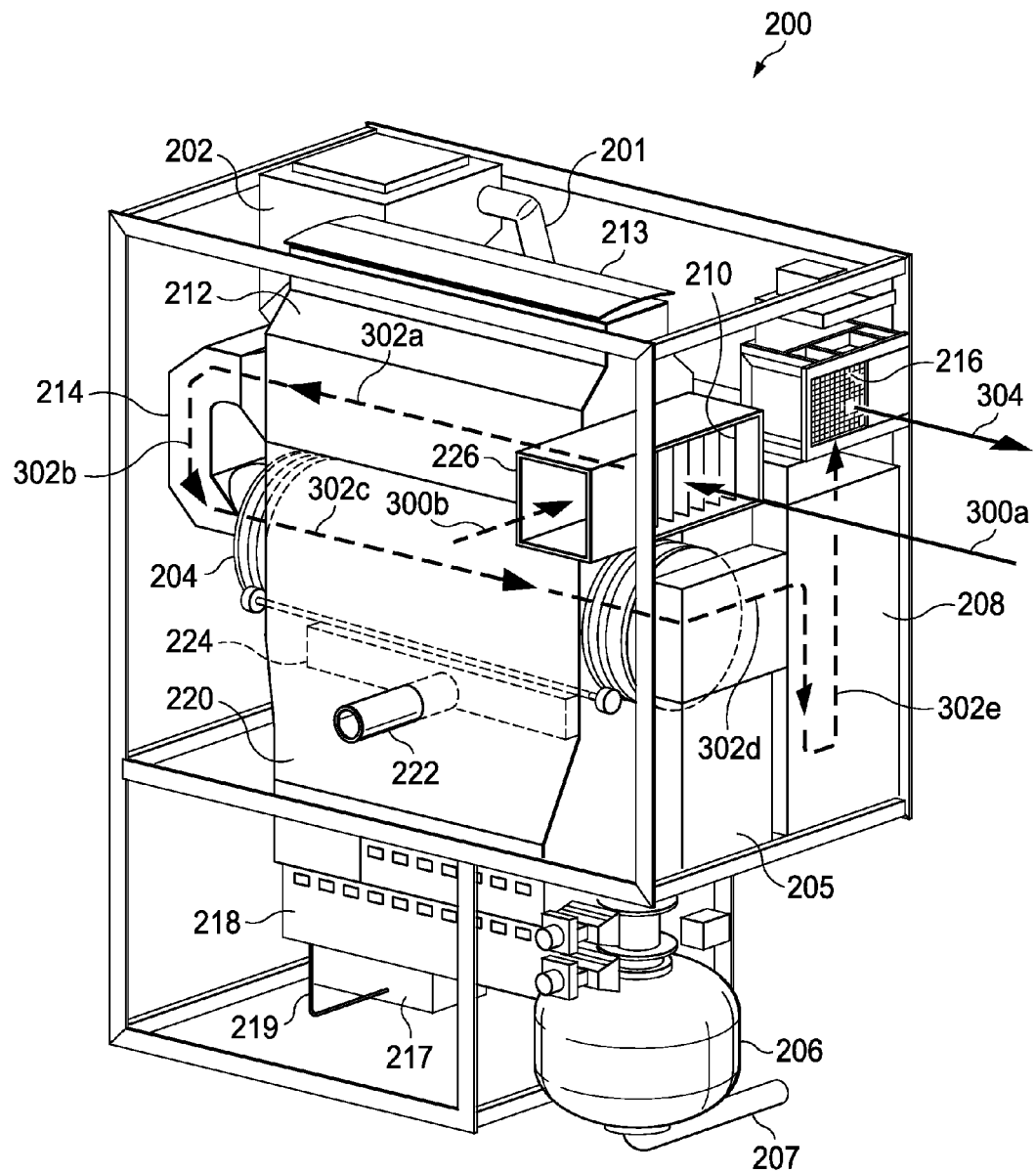
FIGS. 3A and 3B are illustrations of the grit dryer module of FIGS. 2A and 2D, respectively, showing airflow paths of air that is heated and used to dry grit.

With regard to FIG. 3A, the grit dryer module 200 of FIG. 2A is shown with air 300a that is external from the grit dryer module 200 to be drawn through the air intake vent 210. The air 300a is drawn through the heat exchanger 212 and is heated to become heated air 302a. As described with regard to FIG. 2A, the air 300a is heated by hot air that is produced by a heat source, such as the burner 218, engine exhaust, or engine (e.g., engine block or radiator). As previously described, the air 300a may be heated directly or indirectly depending upon the source from which the hot air is produced. The heated air being channeled through the air conduit 214 is designated as air 302b that is directed into the rotary drum 204. The air 302b, designated as air 302c when inside the rotary drum 204, is applied to grit that is rotating within the rotary drum 204 to evaporate moisture content that is on the grit. As the air 302c exits the rotary drum 204, the air is designated as 302d. The air 302d enters the dust collector and is designated as air 302e. As the air 302e is drawn up in the dust collector through air filters (not shown), the air is exhausted by the exhaust fan 216 and designated as exhaust air 304. The exhaust air 304 is generally clean air as it has been filtered by the air filters and may contain moisture that is evaporated from the grit by the heated air.

As previously described, the exhaust fan 216 may have enough power such that the air being drawn across the grit within the rotary drum is traveling between approximately 40 and 50 miles an hour. However, the air speed through the rotary drum 204 may have higher or lower speeds, but that the air flow rate should be below approximately 90 miles per hour to avoid causing the grit to be materially deflected while in the rotary drum 204. As further shown in FIG. 3A, air 300b that is being channeled into the engine heat input port 226 may be heated air that is coming from the engine (not shown). The heated air 300b is clean air in that it is not exhaust coming from the engine. In one embodiment, the heated air 300b is being blown from a fan in the engine, such that it is being positively pressured into the engine heat input port 226. Alternatively, the air 300b may be drawn by negative pressure created by the exhaust fan 216, as previously described. The air 300b may be combined with the air 300a. Alternatively, the air 300b, which may be at a temperature of approximately 250 degrees Fahrenheit or otherwise, may be the only air that is drawn into and through the heat exchanger 212, additionally heated, and used for drying the grit within the rotary drum 204.

Figure 3B:
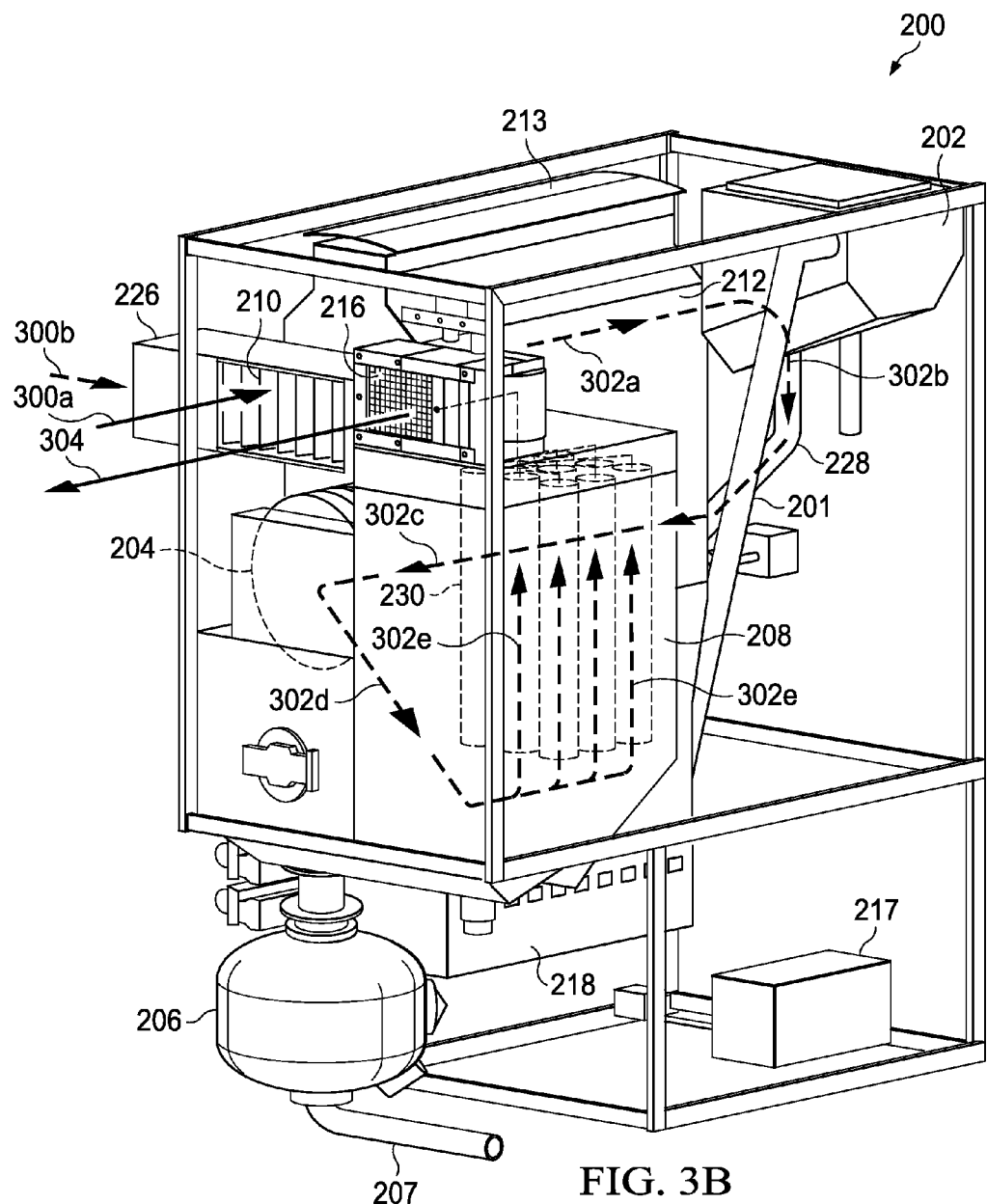

With regard to FIG. 3B, another view of the grit dryer module 200 is shown to provide another view of the airflow path of the air that is being used to dry grit in the rotary drum 204. In this view, the air 302e is shown to be drawn through the air filters 330 prior to being exhausted by the exhaust fan 216.

While the grit dryer module 200 is shown to have the exhaust fan 216 configured to draw the air from top to bottom through the rotary drum 204, it should be understood that the exhaust fan 216 may be configured such that the airflow travels in the other direction (i.e., from bottom to top through the rotary drum 204). In such a configuration, the other components within the airflow shown in FIG. 3B would also be reversed, such that the air is heated by the heat exchanger 212 on the opposite side of the rotary drum 204 and the dust collector 208 is fluidly positioned between the upper side (i.e., top of slope) of the rotary drum 204 and the exhaust fan 216. By using such a configuration, the moisture content removed from the grit does not contact the dried grit as it passes through the rotary drum 204 and, as hot air rises, the exhaust fan 216 has less resistance to overcome by drawing the hot air from the upper side of the rotary drum 204.

Figure 3C:
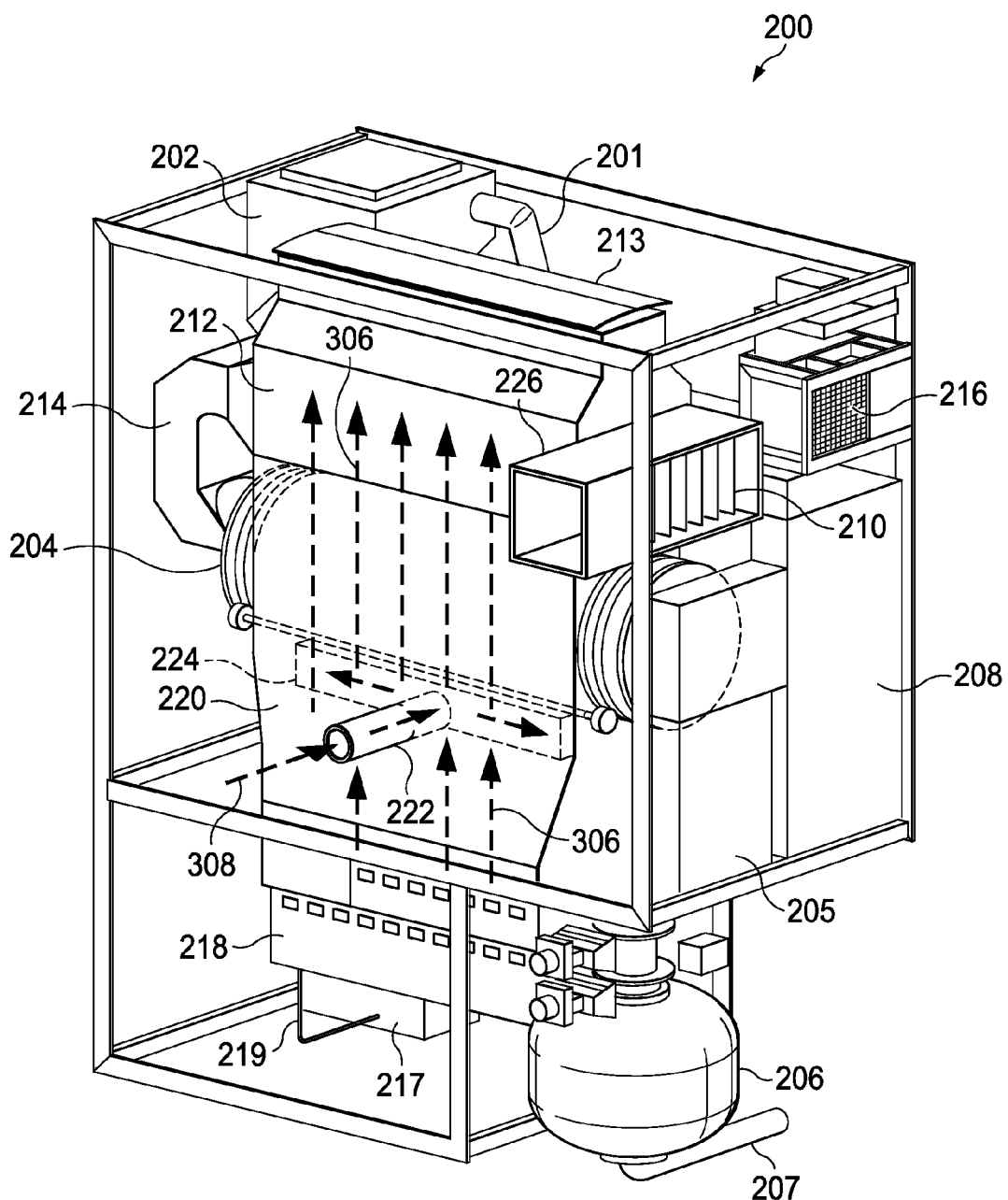
FIG. 3C is an illustration of the grit dryer module of FIG. 2A showing heat from heat sources used to heat air for drying grit.

With regard to FIG. 3C, heated air 306 and 308 from heat sources (e.g., engine and burner 218) is shown in the grit dryer module 200. Heated air 306 is used to indirectly heat the grit in the rotary drum 204 by heating air in which the grit is exposed within the rotary drum 204. In addition, the heated air 306 that is being used to indirectly heat the grit is used in the heat exchanger 212 to heat air 300a and/or 300b (FIGS. 3A and 3B) that is entering the heat exchanger 212. In addition, engine exhaust 308 may enter the engine exhaust conduit 222 to provide additional heat to the rotary drum 204 via the rotary drum heater manifold 224. These two indirect heat sources may be controlled manually or via a processing unit based on temperature within the rotary drum 204 and moisture level sensed in the rotary drum or elsewhere.

Figure 3D:
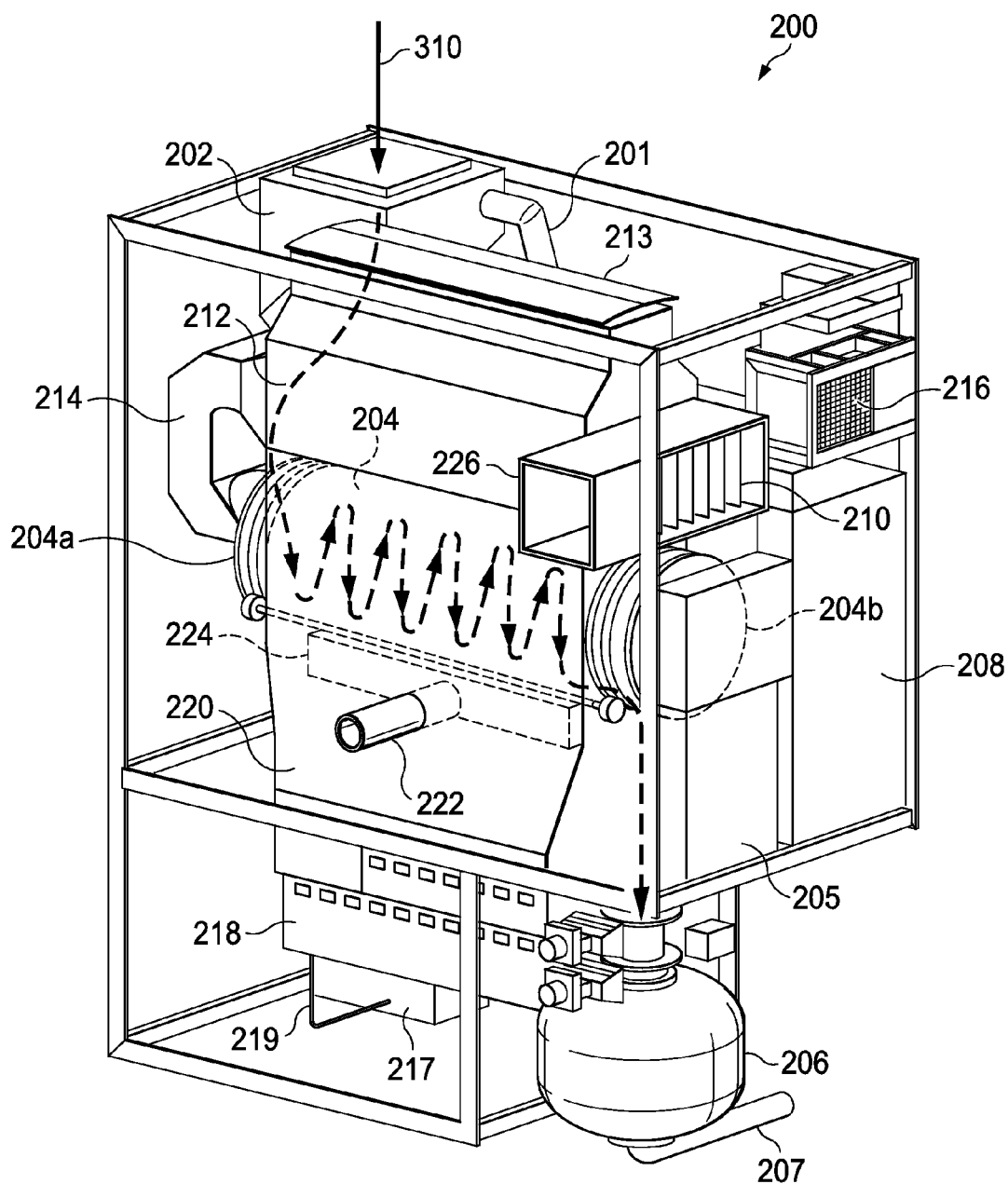
FIG. 3D is an illustration of the grit dryer module of FIG. 2A showing a flow path for grit that is being dried by the grit dryer module.

With regard to FIG. 3D, a grit flow path is shown through the grit dryer module. Grit 310 is shown to enter hopper 202 and be guided into the rotary drum 204. As the grit enters the rotary drum 204, the grit is lifted up on strakes (See, FIGS. 2E and 2F) and dropped through air 302c (See, FIGS. 3A and 3B) for removing moisture content from the grit through evaporation or other thermodynamic processes. As the grit traverses through the rotary drum 204, the grit is continuously lifted and dropped through the heated air 302c until the grit eventually is passed out of the rotary drum 204 and into the pneumatic conveyor tank for being passed to another module, such as the classifier. Ultimately, the dry grit is stored in a storage tank (not shown). Once dry, the dry grit may be stored in the storage tank without concern for being compromised in terms of rusting or clumping.

With regard to FIG. 4, an illustration of an illustrative portion of an abrasive blasting system 400 is shown to include a pre-classifier module 402, grit dryer module 404, and classifier module 406. In addition, a controller 408 that is used to control operation of the modules 402, 404, and 406 is shown. The controller 408 may include a processing unit 410 that executes software 412. The software 412 may be configured to receive and process signals for controlling the functionality of any of the modules 402, 404, and 406, such as heat being applied to grit for drying the grit in grit dryer module 404. The processing unit may be in communication with memory 414 that is configured to store software and data, and input/output (I/O) unit 416. The I/O unit 416 may be configured to communicate locally with modules 402, 404, and 406, as well as other modules and electronic devices on the abrasive blasting system. In addition, the I/O unit 416 may be configured to communicate remotely from the abrasive blasting system to a remote server via a communications network, such as a mobile telephone network, satellite network, or any other communications network (e.g., the Internet), as understood in the art. The I/O unit 416 may communicate telemetry data or other data (e.g., control data, alerts, notifications, alarms, etc.) to the remote server and be configured to receive data from the remote server for control of any device or function of the abrasive blasting system.

Humidity sensor(s) 418a may be positioned in the pre-classifier module 402 for use in sensing humidity of grit that is entering the pre-classifier module 402. Additional humidity sensor(s) 418b shown in grit dryer module 404 may be configured to sense humidity of the grit in the rotary drum or elsewhere. The humidity sensors 418a and 418b are used to sense humidity in the air, which is indicative of moisture content on the grit. In addition, temperature sensor(s) 420 may be positioned within the grit dryer module 404 to sense air that is being heated to be applied or being applied to the grit within the rotary drum. A speed sensor 422 may be used to sense rotation speed of the rotary drum.

The pre-classifier module 402 may include a pneumatic conveyor tank 424 and control element 426, such as valve(s) or selector switch that is used to direct grit being passed by the pneumatic conveyor tank 424 to the grit dryer module 404, classifier module 406, or neither, depending upon a state of the control element 426. The control element 426, while shown as a selector switch which directs which conduit 427a or 427b through which the grit is to be blown, individual valves, such as pinch valves (not shown) that may be opened and closed on each of the conduits 427a and 427b are connected.

In operation, the sensors 418a, 418b, 420, and 422 may generate sensor signals 428a-428n that are communicated to the controller 408 for processing by the software 412 on the processing unit 410. The input signals 428a-428n may be used for determining whether to route the grit to the grit dryer module 404 if moisture content is sensed by the humidity sensor(s) 418a or skip the grit dryer module 404 and route the grit directly to the classifier module 406 if the humidity sensor(s) 418a sense that the grit has little or no moisture content. It should also be understood that if the humidity sensor(s) 418a sense that the air humidity, whether or not the grit itself has moisture content, is above a certain level, that the controller 408 may determine to route the grit to the grit dryer module 404. The processing unit 410 may generate control signals 430a-430n to control speed of a motor 432 that is rotating the rotary drum to alter duration of time in which the grit is exposed to the heated air, alter slope of the rotary drum, turn on and off heat sources, adjust air intake vent louver positions, increase burner output, open and close valves, change state of the control element 426, generate notifications or alarms, engage/disengage a clutch of the motor, turn on and off pneumatic conveyors, and perform other control signals.

Figure 5:
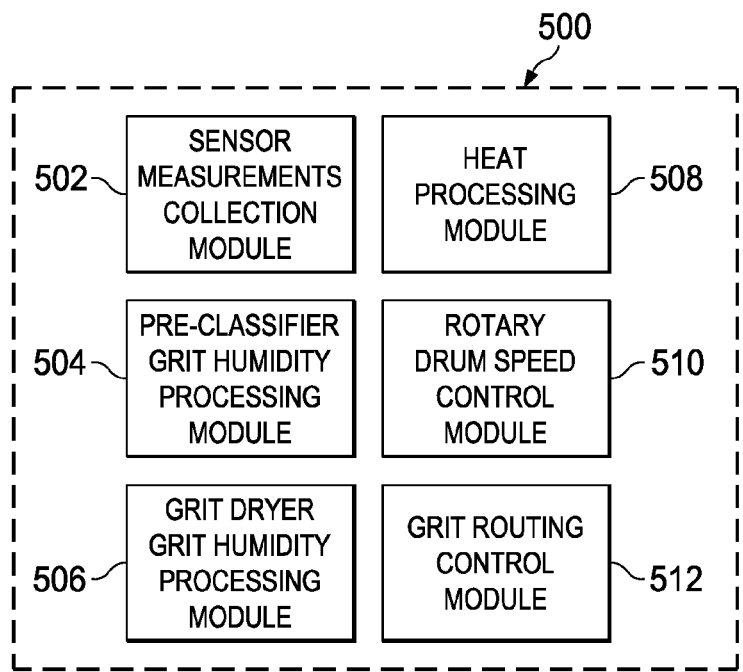
FIG. 5 is a block diagram of illustrative software modules executed by a processing unit of the abrasive blasting system.

With regard to FIG. 5, a block diagram of illustrative software modules 500 are shown. These software modules 500 may be software that is executed by the processing unit 410 as part of the software 412. The software modules may include a sensor measurements collection module 502 that is configured to collect input signals from each of the sensors on the abrasive blasting system. A pre-classified grit humidity processing module 504 may be configured to process the input signals from the humidity sensor(s) located in the pre-classifier module to determine whether the grit should be routed to the grit dryer module 404 or classifier module 406. A grit dryer grit humidity processing module 506 may be configured to process input signals from the humidity sensor(s) 418b to determine how much humidity is in the air in which the grit is being dried. A heat processing module 508 may be configured to process input signals from temperature sensor(s) in the grit dryer module. The heat processing module 508 may be configured to determine how much heat is to be applied to the grit to dry the grit based on humidity, and turn on/off/adjust heat sources that are being used to heat the air being applied to the grit. A rotary drum speed control module 510 may be configured to control speed at which the rotary drum is rotating. In addition to the rotary drum speed control module, a rotary drum angle control module (not shown) may be configured to adjust the angle at which the rotary drum is angled. The speed and angle of the rotary drum are used to control duration of time that the grit is exposed to the heated air that is passed through the rotary drum, which determines drying times of the grit. A grit routing control module 512 may be configured to, based on grit humidity sensed in the pre-classifier, route the grit to the grit dryer module or classifier module. The modules, when used in combination, may vary certain functions of the abrasive blasting system to cause the grit to dry and minimize energy usage in doing so. For example, air temperature and time in which the grit is exposed to the heated air may be adjusted. It should be understood that alternative and/or additional modules may be utilized to perform the same or analogous functions in accordance with the principles of the present invention.

Figure 6:
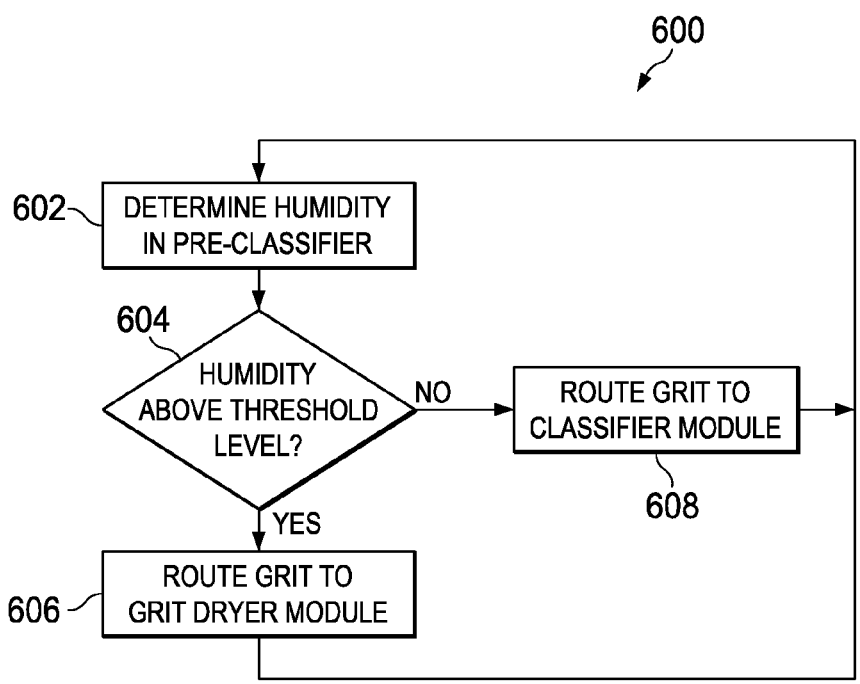
FIG. 6 is a flow diagram of an illustrative process for routing grit.

With regard to FIG. 6, a flow diagram 600 of an illustrative process for routing grit is shown. The process 600 may be performed by processing unit 410 (FIG. 4) that executes software module 512 (FIG. 5). The process 600 starts at step 602, where humidity in the pre-classifier is determined. Humidity sensors in the pre-classifier may communicate data signals to the processing unit for determination of humidity levels, which is indicative of moisture content on the grit. At step 604, a determination may be made as to whether the humidity in the pre-classifier is above a threshold level. If the humidity is above a threshold level, such as 2%, then the process 600 may continue at step 606, where grit may be routed to the grit dryer module for drying the grit. Otherwise, if a determination is made that the humidity is not above the threshold level, then the process continues at step 608 where the grit is routed to the classifier module. The result of step 606 and 608 may be that the processor communicates a control signal to one or more control elements that cause the grit the be routed to the selected module. The process may return to step 602 for continued monitoring of the humidity in the pre-classifier so as to automatically route the grit based on humidity that is sensed. Rather than being automatic, as shown by process 600, a notification may be made to an operator of the abrasive blasting system that the humidity has increased to a certain level and that the grit is to be routed to the grit dryer module. Still yet, even in an automatic configuration, a notification (e.g., message, light, audible sound, or otherwise) may be provided. When switching from drying grit to not drying grit, the flow of grit into the grit dryer module may be ceased while the grit in the grit dryer module may be processed and conveyed to the next module so as to avoid grit being left in the grit dryer, other functionality of the abrasive blasting system may be altered, such as temporarily stopping vacuum pressure or blast pump(s) so that operators are aware of the change in system operation.

Figure 7:
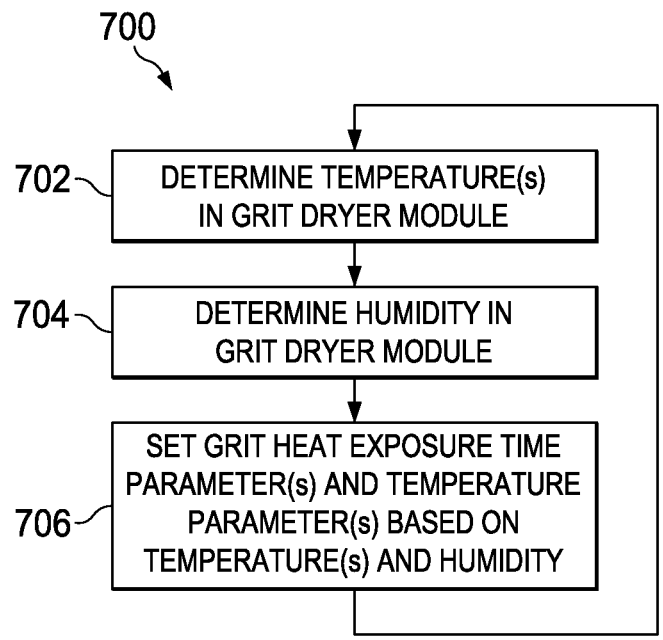
FIG. 7 is a flowchart of an illustrative process for setting grit heat exposure time for drying grit in a grit dryer module.

With regard to FIG. 7, a flowchart of an illustrative process 700 for setting grit heat exposure time for drying grit is shown. The process starts at step 702, where temperature(s) in the grit dryer module may be determined. The temperature(s) may include temperature of air in which the grit is being dried and indirect temperatures of air that is being used to heat the air in which the grit is being dried. Other temperatures, such as temperature of the rotary drum, may be measured and used to vary parameters of the function of the abrasive blasting system (e.g., grit heated air exposure time, burner output, slope of rotary drum, speed of rotary drum), as described below. At step 704, humidity in the grit dryer module may be determined. The humidity may be determined within the rotary drum in one or more locations (e.g., at the input of the rotary drum and output of the rotary drum). At step 706, grit heat exposure time parameter(s) may be set and temperature parameter(s) based on the determined temperature(s) and humidity may be set. In setting the grit heat exposure time and temperature parameter(s), a mathematical or empirical determination may be made so as to fully evaporate moisture content from the grit. It should be understood that being fully dry may be such that no more than a certain percentage of moisture content (e.g., 0.05%). The process may continue at step 702 so that the grit heat exposure time and temperature is continuously monitored and adjusted to maximize efficiency and power usage on the abrasive blasting machine.

Figure 8:
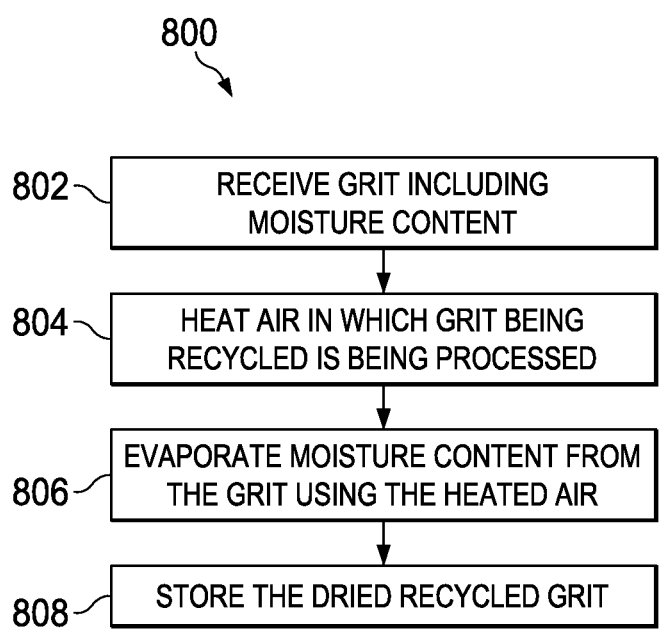
FIG. 8 is a flow diagram of an illustrative process for removing moisture content from grit by a grit dryer module.

With regard to FIG. 8, a flow diagram of an illustrative process 800 for removing moisture content from grit by a grit dryer module is shown. The process 800 starts at step 802, where grit including moisture content is received. At step 804, air in which grit being recycled is being processed is heated. The heating may be direct or indirect heating, as described hereinabove. At step 806, moisture content from the grit using the heated air may be evaporated. In one embodiment, the moisture content may be evaporated passing the grit through the heated air that is being drawn through a rotary drum. At step 808, the dried recycled grit may be stored for reuse by the abrasive blasting system.

While the principles of the present invention have been described using a certain configuration of a grit dryer module to dry the grit, it should be understood that alternative configurations and components may be utilized to dry the grit. For example, rather than using a rotating drum, a conveyor belt may be utilized to enable the grit to be exposed to heated air that is stationary or moving. Other configurations may be utilized to perform the same or equivalent functionality for drawing grit in an abrasive blasting system. In one embodiment, a dehumidifier may be utilized in the grit dryer module to further assist in removing moisture content from the grit. Still yet, a reduced atmospheric environment in which oxygen is reduced could be utilized to assist in removing the moisture content. It should also be understood that the principles described for the abrasive blasting system for drying the grit may be performed on a stand-alone grit dryer system. While the grit dryer has been described for drying grit, it should be understood that other particulate materials may be dried using the principles of the present invention. In the event that a stand-alone grit dryer system is used, it may be placed on a skid, wheels, or other structure to assist operators in moving the grit dryer in a warehouse, waterfront, ship, or elsewhere.

The previous detailed description of a small number of embodiments for implementing the invention is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method for processing grit used for abrasive blasting, said method comprising:
   receiving grit blasted onto a surface, the grit including moisture content;
   actively heating air in which the grit being recycled is being processed, wherein actively heating the air includes producing a flame to cause air in which the grit is being processed to be heated;
   evaporating the moisture content from the grit using the heated air to produce dry recycled grit; and
   storing the dried recycled grit.

2. The method according to claim 1, wherein heating the air includes:
   collecting heat from an engine operating an abrasive blasting process other than drying the grit; and
   channeling the collected heat to cause air in which the grit is being processed to be heated.

3. The method according to claim 1, further comprising rotating the grit to cause the grit to fall due to gravitational forces through the heated air.

4. The method according to claim 3, further comprising applying negative pressure to draw the heated air across the grit when falling.

5. The method according to claim 4, wherein applying negative pressure includes applying negative pressure to draw the heated air at a speed below approximately 90 miles per hour.

6. The method according to claim 1, wherein actively heating the air includes actively heating the air to between approximately 200 degrees Fahrenheit and approximately 700 degrees Fahrenheit.

7. The method according to claim 1, further comprising heating a structure being used to rotate the grit and cause the grit to fall in the structure due to gravitational forces.

8. The method according to claim 7, further comprising disbursing heated air substantially evenly below the structure.

9. The method according to claim 1, further comprising:
   determining that moisture content is no longer contacting the grit being received; and
   redirecting the grit being recycled so as not to be passed through heated air in response to determining that the moisture is no longer contacting the grit being received, otherwise, continuing to pass the grit through the heated air.

10. The method according to claim 9, wherein determining that moisture content is no longer contacting the grit is performed automatically, and wherein redirecting the grit is also performed automatically.

11. The method according to claim 1, further comprising:
   sensing an amount of moisture content contacting the grit; and
   adjusting heated air temperature and time in which the grit is exposed to the heated air based on an amount of moisture content being sensed.

12. The method according to claim 1, wherein producing a flame includes producing a flame that is directed into or contained within a structure in which the grit is being processed.

13. The method according to claim 1, wherein producing a flame within the structure includes producing a flame with only an air medium between the flame and the grit.

14. The method according to claim 1, further comprising rotating the structure to cause the grit to rise and fall within the structure.

15. A method for processing grit used for abrasive blasting, said method comprising:
   receiving grit blasted onto a surface, the grit including moisture content;
   actively heating air in which the grit is being processed, wherein actively heating the air includes producing a flame to cause the air in which the grit is being processed to be heated;
   evaporating the moisture content from the grit using the heated air to produce dry grit; and
   storing the dried grit.

16. The method according to claim 15, wherein producing a flame includes producing a flame that is directed into or contained within a structure in which the grit is being processed.

17. The method according to claim 15, wherein producing a flame within the structure includes producing a flame with only an air medium between the flame and the grit.

18. The method according to claim 15, further comprising rotating the structure to cause the grit to rise and fall within the structure.

* * * * *